United States Patent
Bottlang et al.

(10) Patent No.: US 11,298,913 B2
(45) Date of Patent: Apr. 12, 2022

(54) ENERGY-ABSORBING STRUCTURE WITH DEFINED MULTI-PHASIC CRUSH PROPERTIES

(71) Applicant: Apex Biomedical Company, LLC, Clackamas, OR (US)

(72) Inventors: Michael Bottlang, Happy Valley, OR (US); Jeffrey Bennett, Portland, OR (US)

(73) Assignee: WaveCel, LLC, Wilsonville, OR (US)

( * ) Notice: Subject to any disclaimer, the term of this patent is extended or adjusted under 35 U.S.C. 154(b) by 610 days.

(21) Appl. No.: 15/154,707

(22) Filed: May 13, 2016

(65) Prior Publication Data
US 2016/0353825 A1 Dec. 8, 2016

Related U.S. Application Data

(60) Provisional application No. 62/169,844, filed on Jun. 2, 2015.

(51) Int. Cl.
*B32B 3/12* (2006.01)
*A42B 3/06* (2006.01)
*B33Y 80/00* (2015.01)
*F16F 7/12* (2006.01)

(52) U.S. Cl.
CPC ............ *B32B 3/12* (2013.01); *A42B 3/065* (2013.01); *B33Y 80/00* (2014.12); *F16F 7/121* (2013.01)

(58) Field of Classification Search
CPC ............. A63B 33/00; A42B 1/08; A42B 1/12
See application file for complete search history.

(56) References Cited

U.S. PATENT DOCUMENTS

| | | | | |
|---|---|---|---|---|
| 2,728,479 A | * | 12/1955 | Wheeler | B65D 65/44 156/197 |
| 3,687,223 A | | 8/1972 | Streck | |
| 3,888,531 A | | 6/1975 | Straza | |
| 3,995,901 A | * | 12/1976 | Filbert, Jr | B60R 19/18 293/136 |
| 4,227,593 A | | 10/1980 | Bricmont | |
| 4,492,291 A | * | 1/1985 | Chometon | G21C 19/07 188/377 |

(Continued)

FOREIGN PATENT DOCUMENTS

| | | | |
|---|---|---|---|
| DE | 102008050210 A1 * | 4/2010 | ............ B32B 3/28 |
| EP | 1054183 | 11/2000 | |

(Continued)

OTHER PUBLICATIONS

J.N. Grima, Auxetic Materials, Mar. 2000 (Year: 2000).*

(Continued)

*Primary Examiner* — Mary I Omori
(74) *Attorney, Agent, or Firm* — Schwabe Williamson & Wyatt, P.C.

(57) ABSTRACT

An impact-absorbing structure that includes a plurality of interconnected cells forming a sheet, each cell having a sidewall and a longitudinal axis. Each cell may be configured to absorb energy through plastic deformation in response to an applied load, and a sidewall of at least one cell may include a geometric perturbation that is oriented in a direction that is not parallel to the longitudinal axis of the cell. The geometric perturbation may reduce the load required to cause plastic deformation of the cell.

14 Claims, 11 Drawing Sheets

(56) References Cited

U.S. PATENT DOCUMENTS

| | | | |
|---|---|---|---|
| 4,526,421 A | 7/1985 | Brennan | |
| 5,025,504 A | 6/1991 | Benston | |
| 5,561,866 A | 10/1996 | Ross | |
| 5,649,455 A | 7/1997 | Tsuchihasi | |
| 5,700,545 A | 12/1997 | Audi | |
| 6,065,158 A | 5/2000 | Rush, III | |
| 6,245,408 B1 | 6/2001 | Bitzer | |
| 6,387,200 B1 | 5/2002 | Ashmead | |
| 7,930,771 B2 | 4/2011 | Depreitere | |
| 2004/0117896 A1 | 6/2004 | Madey | |
| 2004/0223876 A1 | 11/2004 | Kirollos | |
| 2006/0059605 A1 | 3/2006 | Ferrara | |
| 2006/0075693 A1* | 4/2006 | Tsunoda | A42B 3/065 52/80.1 |
| 2008/0155735 A1* | 7/2008 | Ferrara | A01N 25/18 2/412 |
| 2011/0233016 A1 | 9/2011 | Lim | |
| 2014/0008925 A1* | 1/2014 | Impero | B60R 19/34 293/133 |
| 2014/0013492 A1* | 1/2014 | Bottlang | A42B 3/064 2/414 |
| 2014/0045962 A1 | 2/2014 | Schofalvi | |
| 2015/0047110 A1* | 2/2015 | Chilson | A42B 3/124 2/414 |
| 2015/0059063 A1* | 3/2015 | Ho | A42C 2/002 2/411 |

FOREIGN PATENT DOCUMENTS

| | | | |
|---|---|---|---|
| EP | 1958889 | 8/2008 | |
| GB | 2323146 | 9/1998 | |
| JP | 2015045349 A * | 3/2015 | ............ B22D 11/145 |
| WO | 2001/045526 A1 | 6/2001 | |
| WO | 2007/042930 A1 | 4/2007 | |
| WO | 2011/148146 A2 | 1/2011 | |
| WO | 2011/139224 A1 | 11/2011 | |

OTHER PUBLICATIONS

Wang et al., Auxetic materials and their potential applications in textiles, 2012, Textile Research Journal (Year: 2012).*
Sanami et al., Auxetic materials for sports applications, 2014, Procedia Engineering 72 (2014) 453-458 (Year: 2014).*
Daniel J. Schaeffler, The differences between stiffness and strength in metal, Dec. 1, 2015 (Year: 2015).*
Yang et al., Energy Absorption of an Re-entrant Honeycombs with Negative Poisson's Ratio, Dec. 22, 2011, Applied Mechanics and Materials, pp. 992-995 (Year: 2011).*
Ikuta et al., machine translation of JP 2015-045349 Abstract and Description, Mar. 12, 2015 (Year: 2015).*
Joern Welsch, machine translation of DE 10 2008 050 210 Abstract, Description and Claims, Apr. 8, 2010 (Year: 2010).*

* cited by examiner

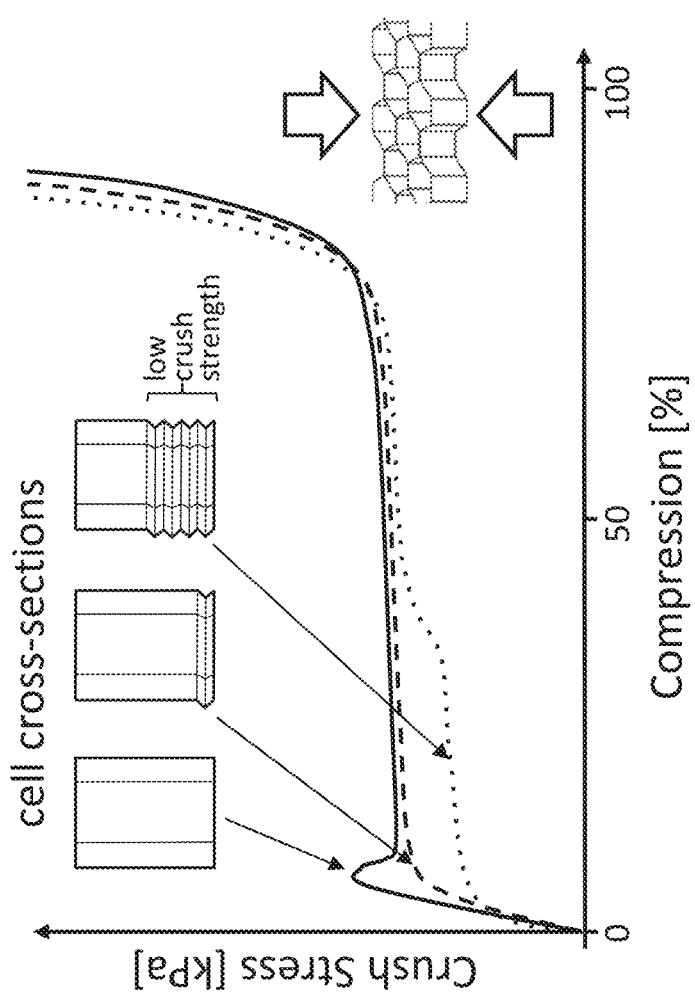

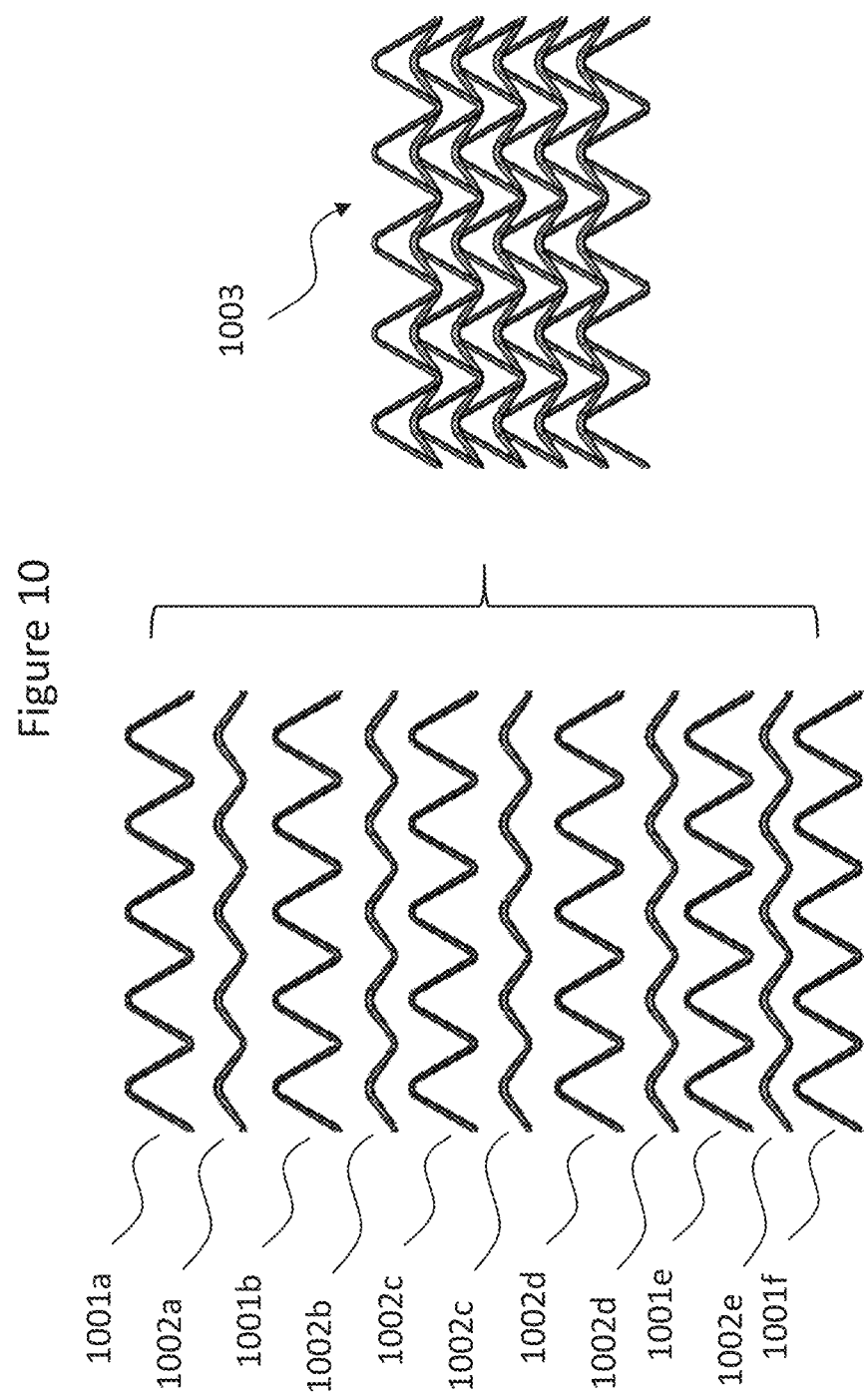

ENERGY-ABSORBING STRUCTURE WITH DEFINED MULTI-PHASIC CRUSH PROPERTIES

CROSS-REFERENCE TO RELATED APPLICATION

This application claims the priority benefit of the earlier filing date of U.S. Provisional Patent Application No. 62/169,844, filed Jun. 2, 2015, which is incorporated herein by reference in its entirety.

GOVERNMENT INTERESTS

This invention was made with government support under NS074734 awarded by the National Institutes of Health. The government has certain rights in the invention.

TECHNICAL FIELD

Embodiments relate to impact-mitigating cellular structures, such as lightweight honeycomb structures with defined crush properties, such as controlled buckling of interconnected cells by plastic deformation.

BACKGROUND

Energy-absorbing cellular structures are used in a wide variety of applications, including liners of head protective devices, body armor, and floor and wall liners, to reduce the risk of injury from impacts. Energy-absorbing structures made of rubber or expanded foam frequently are used to cushion impacts by absorbing energy elastically in order to prevent injury. Compared to these materials, an energy-absorbing structure with regular cell geometry, such as a honeycomb, may be less dense and lighter, and may allow ventilation through the structure, which is desirable for example for cooling when used as an impact liner in helmets. Furthermore, honeycomb structures undergo mainly plastic, non-recoverable deformation by controlled buckling during impact. This type of energy absorption stores minimal energy and therefore eliminates the potential for hazardous rebound force found in elastic materials.

An inherent limitation of standard honeycomb structures is their non-linear compressive stiffness, which is characterized by a high initial stiffness that decreases after the onset of cell buckling. More specifically, the buckling of cells by compression in the direction of their longitudinal axis requires a force greater than that required to continue compression of the cell structure. To eliminate this initial stiffness peak, honeycomb structures may be pre-crushed. This pre-crushing initiates random buckling of cell walls, which typically starts at the upper or lower edge of a cell. However, while the extent of buckling may be controlled by the extent of pre-crushing, it is impossible to ensure that crumpling occurs within a defined location along the cell axis.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 2A and 2B are two graphs showing the correlation between the effect of cell sidewall perturbations on crush stress as a function of compression (FIG. 2A) and the effect of cell sidewall perturbations on shear stiffness (FIG. 2B), in accordance with various embodiments;

FIG. 10 depicts a method for manufacturing the impact-absorbing honeycomb of FIG. 8 by additive manufacturing of two types of layers in an alternating manner, in accordance with various embodiments.

DETAILED DESCRIPTION OF DISCLOSED EMBODIMENTS

Figure 1:
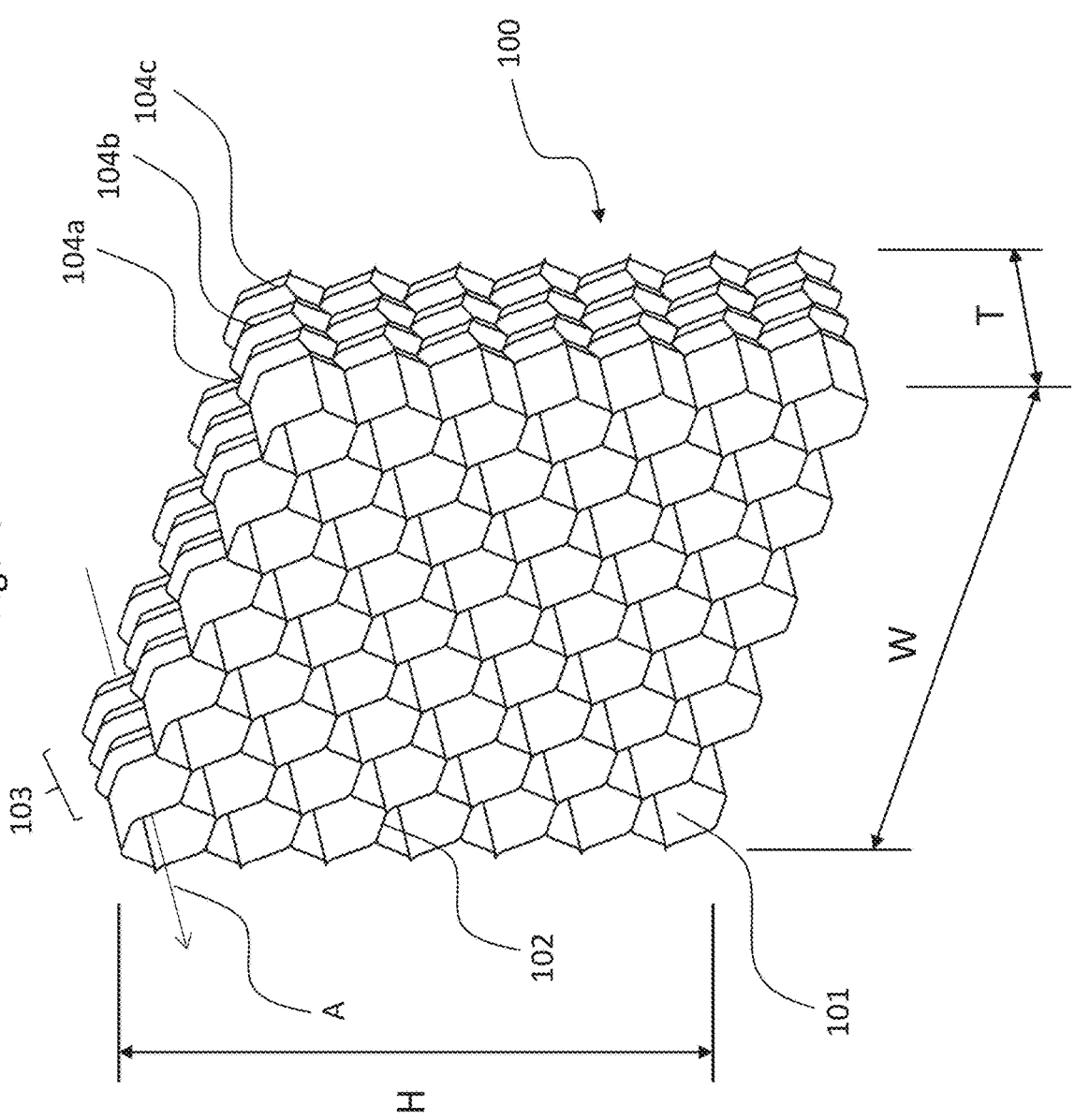
FIG. 1 is a perspective view of a honeycomb with hexagonally shaped cells that include geometric perturbations that are not substantially parallel to the longitudinal axis of the cells, in accordance with various embodiments.

In the following detailed description, reference is made to the accompanying drawings, which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide energy-absorbing structures with modifiable stiffness and crush strength, as well as methods of modifying the stiffness and crush strength of an energy-absorbing structure. In various embodiments, the energy-absorbing structures include a repeating pattern (e.g., as a sheet) of voids that form cells that are oriented substantially in the same direction, and the longitudinal direction of each of the cells is oriented substantially perpendicular to the plane of the structure. In various embodiments, such structures may take the form of a cellular and/or honeycomb configuration. The term honeycomb as used herein is not intended to refer to a particular pattern or cross-sectional geometry, but rather a matrix of cells in a pattern, whether repeated, ordered, semi-ordered, or random in cell composition.

In various embodiments, one or more geometric perturbations may be applied to the cell sidewall(s) in a direction that is not substantially parallel to the longitudinal axis of the cells (e.g., in a substantially transverse or perpendicular direction) in order to reduce the stiffness and crush strength of the structure in a controlled manner, for example to reduce a load required to cause plastic, as opposed to elastic, deformation of the cell. Thus, disclosed is an impact-absorbing structure that includes a repeating pattern of cells, each cell having a longitudinal axis and being adapted to absorb energy in one or more planes through plastic deformation in response to an applied load. In embodiments, a sidewall of one or more of the cells includes a geometric perturbation oriented in a predominantly transverse direction relative to the longitudinal axis, where the geometric perturbation reduces a load required to cause plastic deformation of the one or more of the cells in a direction perpendicular to the longitudinal axis of the cells.

In some embodiments, the geometric perturbations are substantially perpendicular to the longitudinal axis of the cells, such as perpendicular to a line passing through the center of the cell(s). In embodiments, the geometric perturbation decreases crush stress at an onset of compression in a direction parallel to the longitudinal axis of the cell(s). In embodiments, a cell exhibits a plurality of compressive stiffness values when a load is applied to the at least one cell in a direction parallel to the longitudinal axis of the at least one cell, for example by using multiple geometric perturbations in the cell wall.

In various embodiments, these geometric perturbations may take the form of creases, folds, thinned regions, bumps, ridges, or a combination thereof. In various embodiments, a wide variety of compressive properties may be achieved by varying the shape, size, orientation, distribution, and number of these geometric perturbations. The geometric perturbations may be ordered in some embodiments, with multiple cells that include similar perturbations. In some embodiments, every cell, or every cell in a region of cells, may include the same or similar perturbations, while in other embodiments, different cells may include different perturbations. In various embodiments, the geometric perturbations may be applied to one or more sidewalls of each cell, or to select cells within the larger structure. Additionally, in some embodiments, a cell sidewall may have one or more geometric perturbations, and these perturbations may be adjacent to each other, or they may be distributed over the cell sidewall. In some embodiments, the geometric perturbations may extend over only a portion of the cell sidewall surface, while in other embodiments, the geometric perturbations may extend across the entire width of a cell sidewall surface. In embodiments, all of the interconnected cells include at least one geometric perturbation in a cell wall. In embodiments, a plurality of interconnected cells that include a geometric perturbation are confined to a region of the impact-absorbing structure. In embodiments, a plurality of interconnected cells that include a geometric perturbation are uniformly distributed within the impact-absorbing structure. In embodiments, a geometric perturbation is convex, concave, or both convex and concave relative to the sidewall of a cell or two or more adjacent cells. In embodiments, a geometric perturbation is convex relative to the sidewall of a first cell and concave relative to the sidewall of a second cell adjacent to the first cell.

In some embodiments a geometric perturbation, or multiple perturbations, reduces the load required to induce transverse shear of the impact-absorbing structure, for example in response to a tangential load, that is, load applied at an angle that is not parallel to the longitudinal axis of the cell. In some embodiments, a cell may have multiple geometric perturbations, for example to provide for longitudinal crush and transverse shear of the impact-absorbing structure in response to a tangential load.

In an example embodiment where the energy-absorbing structures is part of a helmet liner, the inclusion of reduced shear stiffness may allow the inner surface, such as the surface in contact with the wearer, to move in a transverse direction with respect to the outer portion of a helmet. This transverse movement, when coupled with the axial crush characteristics, allows the liner to absorb an impact and allow the head of the wearer to mover transversely with respect to the outer shell of the helmet, essentially allowing for some slip rather than a stick from a glancing blow. This type of movement may reduce injury such a might be encountered from the wearers head striking the pavement, or other hard surface, for example in a bicycle or motorcycle accident.

In various embodiments, the energy-absorbing cellular structure, for example the honeycomb, may be formed from a polymer, elastomer, metal, cellulose, resin, paper, or from a combination of materials. In various embodiments, the cellular structure may be created by three-dimensional printing, corrugation, expansion, adhesion, or fusion of cells into a honeycomb structure, or by stacking and fusing preformed sheets or cells. In some embodiments, preformed sheets may be created by thermo-forming, for example when thermoplastic materials are used. Alternatively, in other embodiments, sheets may be pre-formed by mechanical stamping or embossing. In embodiments, an impact-absorbing structure is produced by joining a plurality of formed sheets or cells. In embodiments, an impact-absorbing structure is manufactured by producing layers using an additive manufacturing technique. In embodiments, the sheet or cell is produced via extrusion or through a mechanical forming process. In embodiments the geometric perturbation is applied to a preexisting sheet or cell.

In various embodiments, to improve the formability of the energy-absorbing structure, a cell may have a reentrant geometry. A cell with a reentrant geometry will have one or more cell sidewalls that are not simply planar (e.g., flat) junctions with the sidewalls of adjacent cells, but instead have one or more cell sidewalls that have additional curvatures (e.g., reentrant bends) that are oriented in a direction parallel to the longitudinal direction of the cells. Without being bound by theory, it is believed that some reentrant cell geometries may provide a synclastic or auxetic behavior of the honeycomb structure, allowing it to conform to a spherical shape, such as the interior of a helmet, or other headgear, while retaining a regular cell geometry without producing anticlastic behavior and without causing buckling or disruption of the cell sidewalls. In various embodiments, the geometric perturbations of the cell sidewalls described herein may be superimposed on the reentrant cell geometry.

In various embodiments, the structures disclosed herein may afford control of the compressive stiffness and/or shear stiffness of the energy-absorbing cellular structure, as well as the crush strength of the energy-absorbing cellular structure. In some embodiments, by controlling the compressive stiffness, the disclosed structures may eliminate the initial stiffness peak inherent in conventional honeycomb structures. Furthermore, in some embodiments, the disclosed structures may provide a multi-phasic compressive stiffness, wherein the honeycomb may provide a reduced compressive stiffness under initial compression, and a higher compressive stiffness in response to further compression. Additionally, in various embodiments, the disclosed structures may reduce the inherently high shear stiffness of conventional honeycomb structures. In various embodiments, this controlled functionality may be integrated into a singular cellular structure, as disclosed herein.

As described above, various embodiments involve applying geometric perturbations to the cell sidewalls of an energy-absorbing cellular structure, and these perturbations may be applied in a direction not substantially parallel to the longitudinal direction of the cells. In various embodiments, the purpose of these perturbations may be to reduce the stiffness and/or crush strength of the energy-absorbing structure in a controlled manner. Specific, non-limiting examples of the types of perturbations that may be used include geometric perturbations in the form of creases, folds, thinned regions, cuts, slits, bumps, ridges, or a combination thereof.

Various embodiments of the disclosed structures may be used to reduce the compressive stiffness of a honeycomb structure to improve its impact mitigation properties, for example when used as an impact liner in a head protective device such as a helmet. For instance, in some embodiments, such liners may be formed by reducing the shear stiffness of a honeycomb structure by introducing geometric perturbations in cell sidewalls and arranging the perturbations so that they lie in a direction that is not parallel to the longitudinal axis of cells.

Additionally, the crush strength of such honeycomb structures may be reduced, such that the compressive force required to initiation axial compression of cells may be reduced in a controlled and scalable manner by the presence of geometrically defined perturbations in cell sidewalls. In general, the structures disclosed herein may be designed to control the compressive stiffness, shear stiffness, and/or crush strength in a predictable, reproducible manner, and may therefore be used to optimize a wide range of structures used for impact protection and mitigation.

Turning now to the figures, FIG. 1 is a perspective view of an exemplary honeycomb structure with hexagonally shaped cells that include geometric perturbations that are not substantially parallel to the longitudinal axis of the cells, in accordance with various embodiments. In the portion of the exemplary honeycomb structure 100 shown in FIG. 1, the structure 100 has a height H, a width W, and a thickness T. In the illustrated embodiment, a single hexagonal cell 101 is formed by generally flat cell sidewalls 102. To control the crush strength and stiffness of the honeycomb structure 100, one or more geometric perturbations 103 may be applied to or incorporated into one or more cell sidewalls 102. In the illustrated embodiment, the geometric perturbations 103 include three creases 104a, 104b, 104c, which are adjacent to each other, and which are arranged perpendicular to the longitudinal axis A of the cells. In other embodiments, only a single such crease may be employed. In still other embodiments, two or more adjacent creases may be employed, or two or more creases may be distributed along the cell sidewalls and may be separated by spaces. The exemplary honeycomb structure 100 may be formed as a sheet.

Figure 2B:
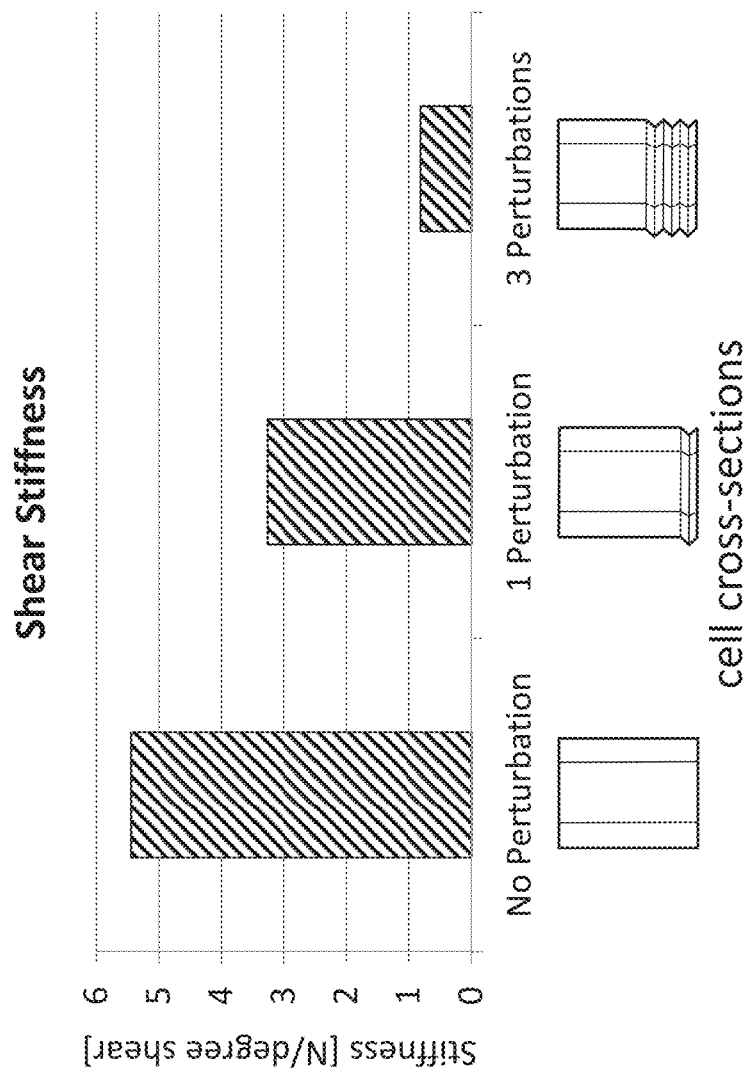

FIGS. 2A and 2B are two graphs showing the correlation between the effect of cell sidewall perturbations on crush stress as a function of compression (FIG. 2A) and the effect of cell sidewall perturbations on shear stiffness (FIG. 2B), in accordance with various embodiments. In the absence of a cell sidewall perturbation as described herein, the buckling of the cells by compression in the direction of their longitudinal axis requires a force greater than that required for continuation of compression of the cell structure. The corresponding crush stress curve, shown as a solid line, depicts a pronounced crush stress peak at the onset of compression. In various embodiments, this initial crush stress peak may be eliminated by the introduction of a singular cell sidewall perturbation as described herein. In various embodiments, this geometrically defined perturbation may allow cell buckling to be initiated at a controlled stress level and location without exhibiting an initial crush stress peak, as depicted by the dashed line. In embodiments, a cell exhibits a plurality of compressive stiffness values when a load is applied to the at least one cell in a direction parallel to the longitudinal axis of the at least one cell.

In other embodiments, a multi-phasic crush stress profile, as depicted by the dotted line, may be achieved by including a series of cell sidewall perturbations as described herein, which may or may not be adjacent to each other. In the illustrated embodiment, the lower crush stress plateau continues until the low crush strength zone is compressed. This initial crush stress plateau represents a reduced initial compressive stiffness. The subsequent crush stress plateau represents an elevated compressive stiffness. As such, the cellular structure exhibits a multi-phasic compressive stiffness.

All three curves of the distinct cellular structures shown in FIG. 2 increase exponentially for compressive strain approaching 100%, which represents complete cell compression that is generally referred to as "bottoming out." Thus, the geometrically defined perturbations described herein may eliminate the initial crush stress peak, and may achieve a controlled, multi-phasic compressive stiffness within a singular cellular structure.

Figure 3:
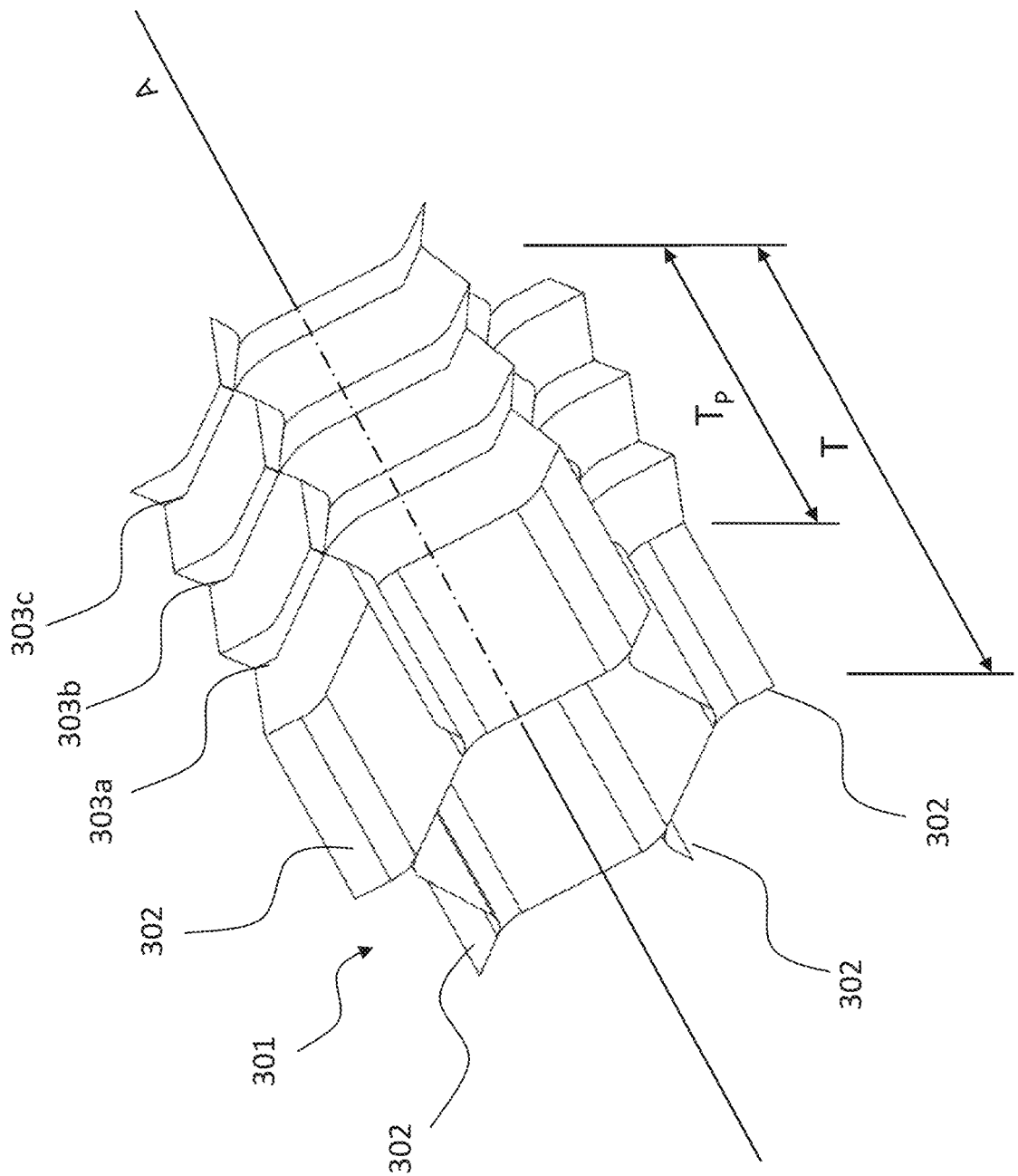
FIG. 3 is a perspective view of a cell from the honeycomb shown in FIG. 1, showing portions of the adjacent cells, in accordance with various embodiments.

FIG. 3 is a perspective view of a cell from the honeycomb shown in FIG. 1, showing portions of the adjacent cells, in accordance with various embodiments. As shown in FIG. 3, a single honeycomb cell 301 may have three adjacent geometric perturbations 303a, 303b, 303c that circumscribe the cell 301 in a direction not parallel to the longitudinal axis A of the cell 301. The surrounding honeycomb cell sidewalls 302 are partially shown. In the illustrated embodiment, the cell 301 has a height T, and the cell portion with geometric perturbations 303a, 303b, 303c has a height $T_P$. In various embodiments, if axial compression is applied to the cell 301 along the longitudinal axis A, the cell portion with height $T_P$ may have a lower compressive stiffness than the remaining portion of the cell 301 without geometric perturbations 303a, 303b, 303c. Therefore, the cell 301 may exhibit a multi-phasic stiffness instead of a linear stiffness, thus behaving softer under initial compression, and harder under continued compression in excess of compressive stiffness of the cells portion with height $T_P$.

In this exemplary embodiment, the geometric perturbations 303a, 303b, 303c are illustrated as generally triangular in shape. However, other embodiments may include geometric perturbations that have a rectangular, sinusoidal, or trapezoidal shape, or a combination of different shapes. In the illustrated embodiment, the geometric perturbations 303a, 303b, 303c circumscribe the cell 301 perpendicular to the longitudinal axis A. Other embodiments may include geometric perturbations that are arranged oblique to the longitudinal axis A. Additionally, although the cell 301 is illustrated as having a hexagonal shape, in other embodiments the cell may have any other shape that is suitable for regular cellular structures.

In some embodiments, honeycomb structures having hexagonal or cylindrical cells may provide an inherently rigid structure that is difficult to conform to a curved surface. Moreover, such standard honeycombs may exhibit a pronounced anticlastic behavior, wherein bending of the honeycomb in one plane will induce a saddle-shaped rather than a cylindrical deformation of a synclastic material. In various embodiments, this anticlastic behavior may make it impossible to conform a standard honeycomb to a spherical shape, as for example the shape of a helmet, without disrupting its regular cell geometry.

For this reason, as disclosed in U.S. Pat. No. 5,561,866, a pattern of individual, flat honeycomb segments may be arranged to approximate to the spherical helmet shape, rather than forming a continuous honeycomb liner. To overcome this formability limitation described in U.S. Pat. No. 5,561,866, honeycomb structures of the present disclosure may have a reentrant cell geometry, wherein the cell sidewalls have additional curvatures that are oriented in a direction parallel to the longitudinal direction of the cells. In various embodiments, this reentrant cell geometry may allow the honeycomb structure to conform to a spherical shape without experiencing anticlastic behavior and without causing buckling or disruption of the cell sidewalls.

Figure 4:
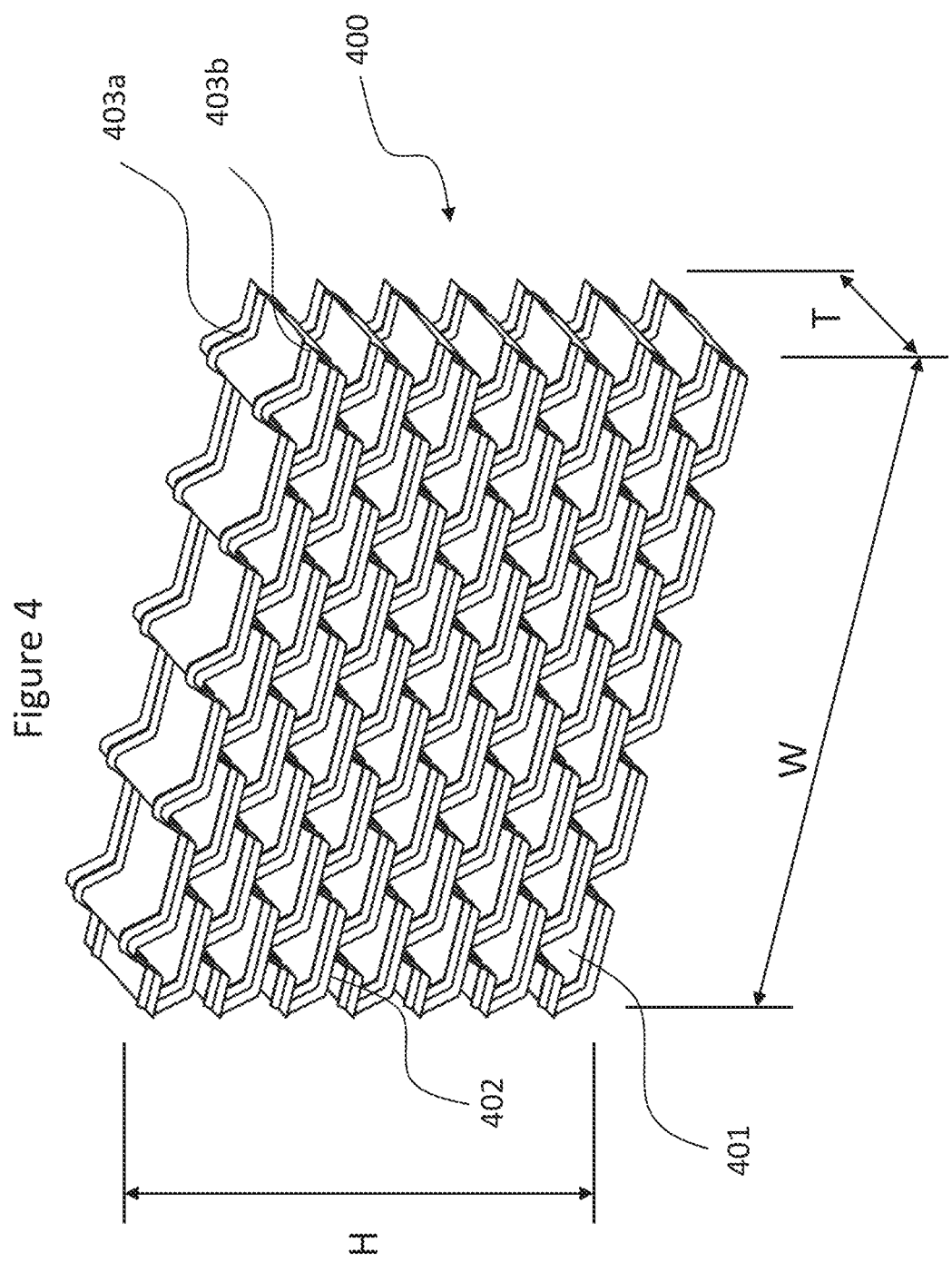
FIG. 4 is a perspective view of a honeycomb with non-hexagonally shaped cells that achieve a re-entrant structure with improved formability, including geometric perturbations that are not substantially parallel to the longitudinal direction of cells, in accordance with various embodiments.

FIG. 4 is a perspective view of a honeycomb with non-hexagonally shaped cells that achieve a re-entrant structure with improved formability, including geometric perturbations that are not substantially parallel to the longitudinal direction of cells, in accordance with various embodiments. As illustrated in FIG. 4, in various embodiments, the cellular structure 400 may employ a reentrant geometry for its cells 401. In various embodiments, this cellular structure 400 may enable the structure 400 to be conformed into a spherical shape, while still retaining a regular geometry of its cells 401. In various embodiments, the cellular structure 400 may have a height H, a width W, and a thickness T, and a single hexagonal cell 401 may be formed with generally flat cell sidewalls 402. In the illustrated embodiment, the cells 401 have two geometric perturbations 403a, 403b that are not adjacent to each other.

Figure 5:
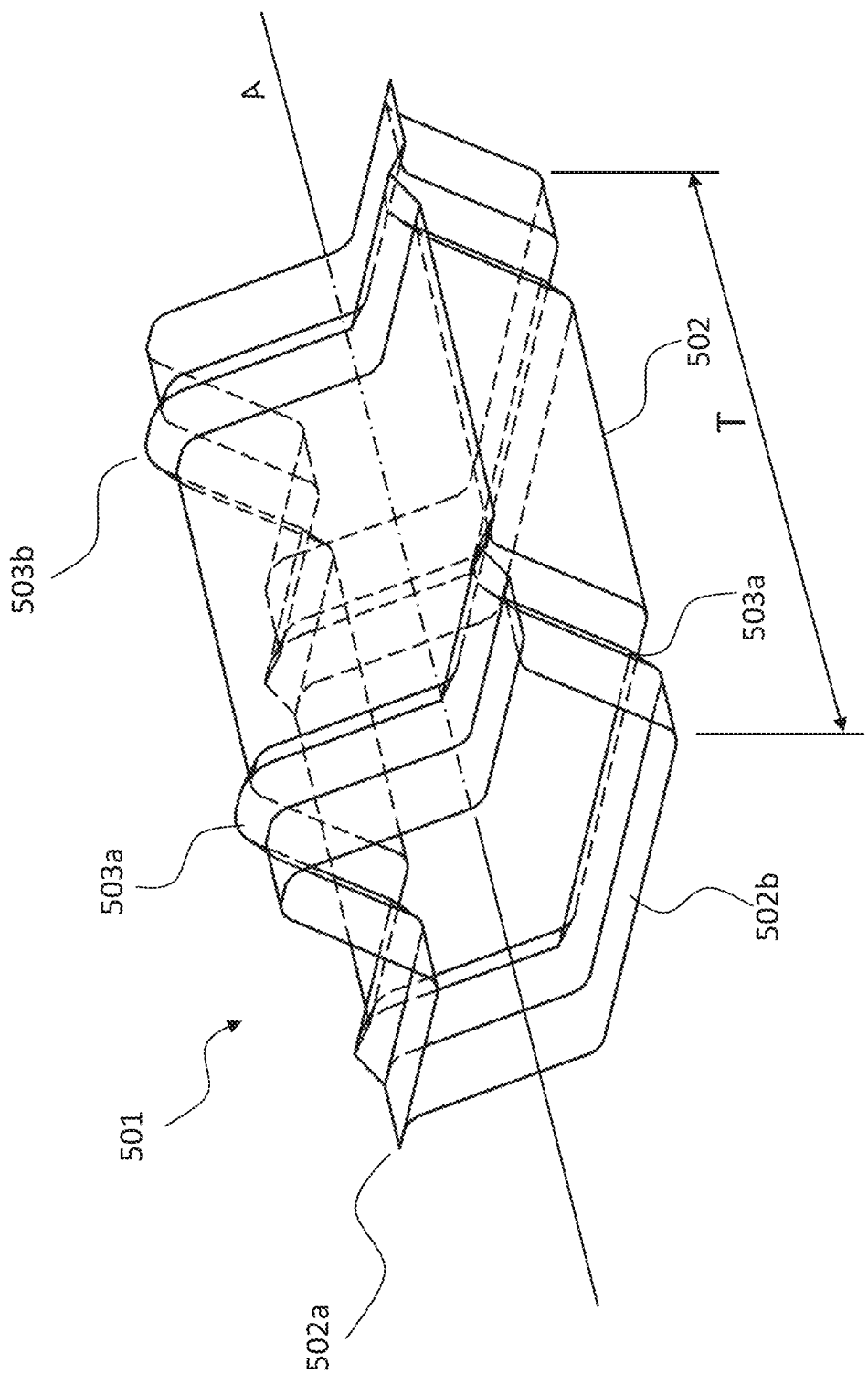
FIG. 5 is a perspective view of a cell from the honeycomb shown in FIG. 4, showing portions of the adjacent cells, in accordance with various embodiments.

FIG. 5 is a perspective view of a cell from the honeycomb shown in FIG. 4, showing portions of the adjacent cells, in accordance with various embodiments. As illustrated in FIG. 5, the illustrated embodiment shows a single honeycomb cell 501 with two non-adjacent geometric perturbations 503a, 503b that circumscribe the cell 501 in a direction not parallel to the longitudinal axis A of the cell 501. The surrounding honeycomb cell sidewalls 502 are partially shown as formed from first sidewall 502a and second sidewall 502b, and the cell 501 has a height T. In the illustrated embodiment, a first geometric perturbation 503a is applied in a convex manner relative to a first sidewall 502a of the cell 501. In the embodiment shown, the geometric perturbation 503a is applied in a concave manner relative to a second sidewall 502b of the cell 501. In various embodiments, this alternating arrangement of convex and concave perturbations may enable a regular cell geometry of the cellular structure. In various embodiments, if the cellular structure is manufactured by fusion of pre-formed sheets, this alternating arrangement of concave and convex perturbations may facilitate the accurate alignment and stacking of preformed sheets to assemble a regular cellular structure.

Figure 6:
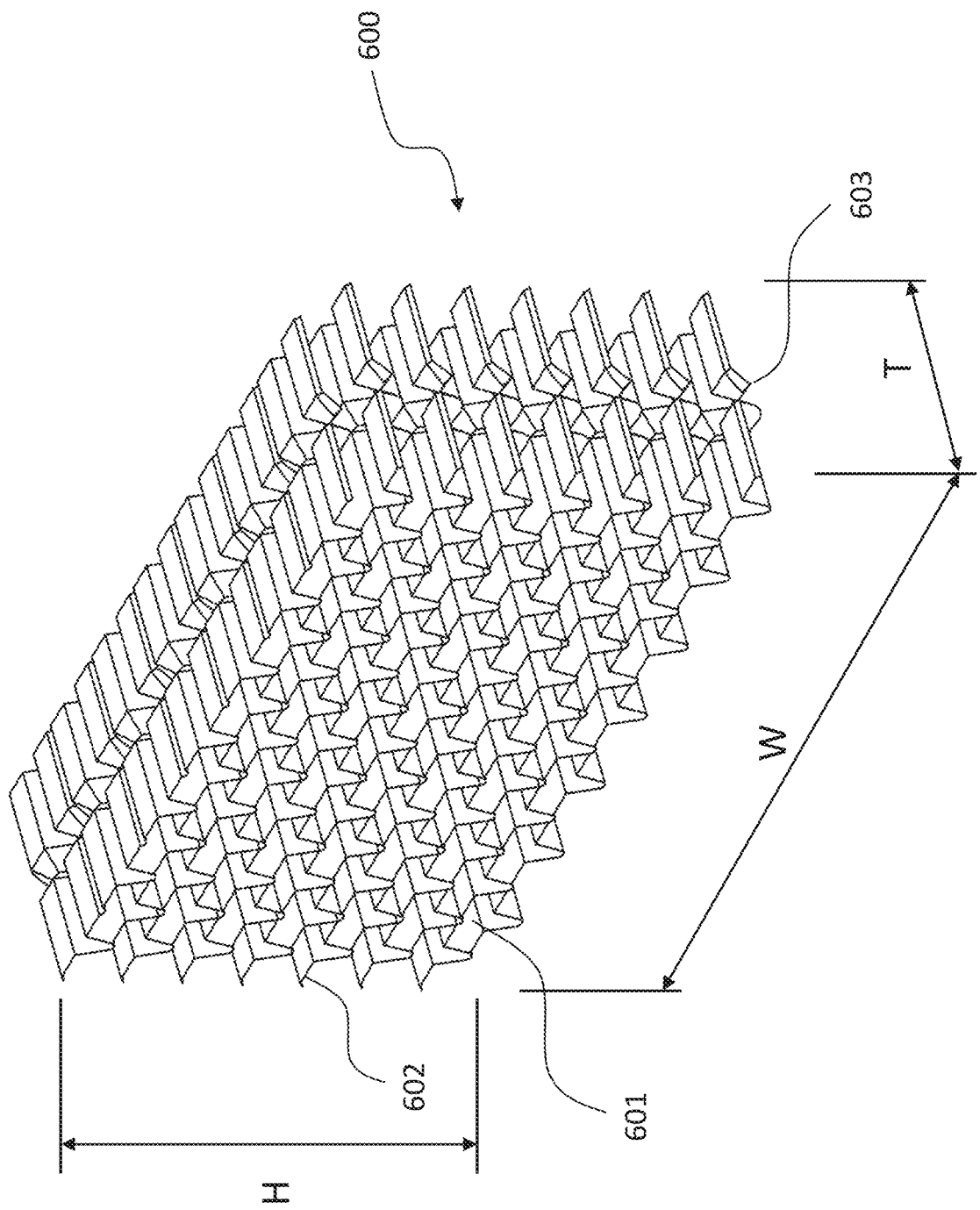
FIG. 6 is a perspective view of a honeycomb with non-hexagonally shaped cells that achieve a structure with improved formability, including geometric perturbations along the cell mid-section that are not substantially parallel to the longitudinal direction of cells, in accordance with various embodiments.

FIG. 6 is a perspective view of a honeycomb with non-hexagonally shaped cells that achieve a re-entrant structure with improved formability, including geometric perturbations along the cell mid-section that are not substantially parallel to the longitudinal direction of cells, in accordance with various embodiments. As illustrated in FIG. 6, a cellular structure 600 with a reentrant geometry of the cells 601 may be employed so that the cellular structure 600 may be conformed to a spherical shape while still retaining a regular geometry of its cells 601. In the illustrated embodiment, the cellular structure 600 has a height H, a width W, and a thickness T. In the illustrated embodiment, the cells 601 have been formed using generally flat cell sidewalls 602. The cells 601 of the illustrated embodiment have one geometric perturbation 603 that is located in the midsection of the cells 601.

Figure 7:
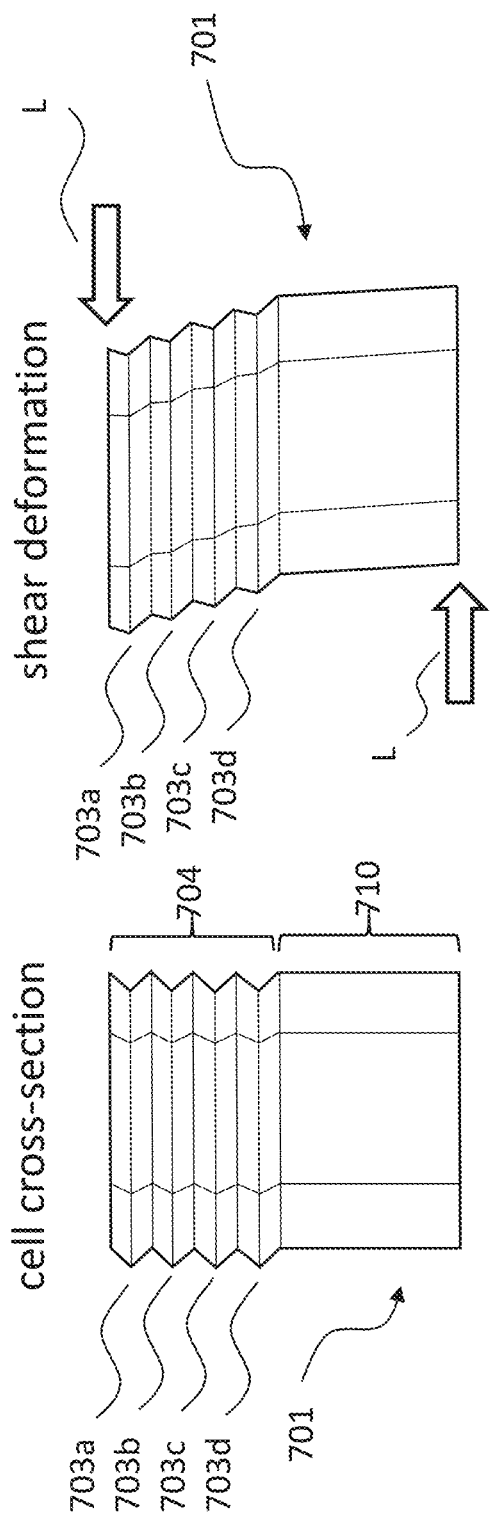
FIG. 7 depicts a cross-section of a hexagonal cell with four adjacent geometric perturbations in the absence and presence of shear load, in accordance with various embodiments.

FIG. 7 depicts a cross-section of a hexagonal cell with four adjacent geometric perturbations in the absence and presence of shear load, in accordance with various embodiments. In the embodiment illustrated in FIG. 7, a cross-section of a hexagonal cell 701 is depicted with four adjacent geometric perturbations 703a, 703b, 703c, 703d in the absence and presence of a shear load L. The lower section 710 of cell 701 does not have geometric perturbations 703 and exhibits little deformation under shear load L. In contrast, the geometric perturbations 703a, 703b, 703c, 703d in the upper section 704 of cell 701 decrease shear stiffness of the cell 701 and undergo greater shear deformation in response to shear load L than the lower section 710. Therefore, in various embodiments, the shear stiffness of a cellular structure may be reduced in a controlled manner by the introduction of geometrically defined perturbations, as disclosed herein.

Figure 8:
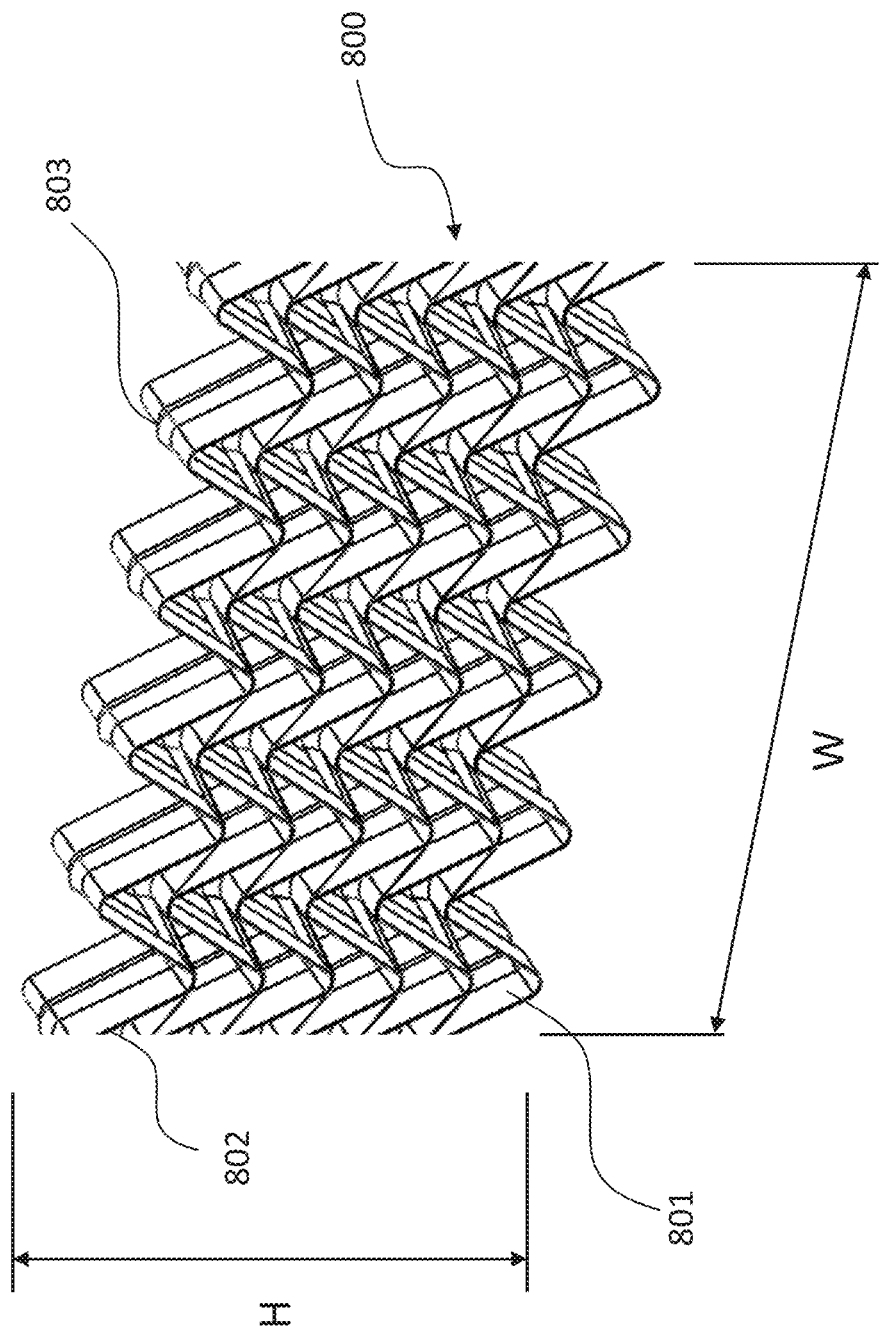
FIG. 8 is a perspective view of a honeycomb with non-hexagonally shaped cells that achieve a structure with improved formability and with synclastic deformation behavior, including geometric perturbations along the cell mid-section that are not substantially parallel to the longitudinal direction of cells, in accordance with various embodiments.

FIG. 8 is a perspective view of a honeycomb with non-hexagonally shaped cells that achieve a re-entrant structure for improved formability, and a synclastic behavior that will cause the honeycomb to naturally deform into a spherical shape in response to bending, based on the negative Poisson ratio of the particular cell configuration. The honeycomb furthermore includes geometric perturbations along the cell mid-section that are not substantially parallel to the longitudinal direction of cells, in accordance with various embodiments. As illustrated in FIG. 8, a cellular structure 800 with a reentrant geometry of the cells 801 may be employed so that the cellular structure 800 exhibits a synclastic behavior upon bending. In the illustrated embodiment, the cellular structure 800 has a height H, and a width W. In the illustrated embodiment, the cells 801 have been formed using generally flat cell sidewalls 802. The cells 801 of the illustrated embodiment have one geometric perturbation 803 that is located in the midsection of the cells 801.

Figure 9:
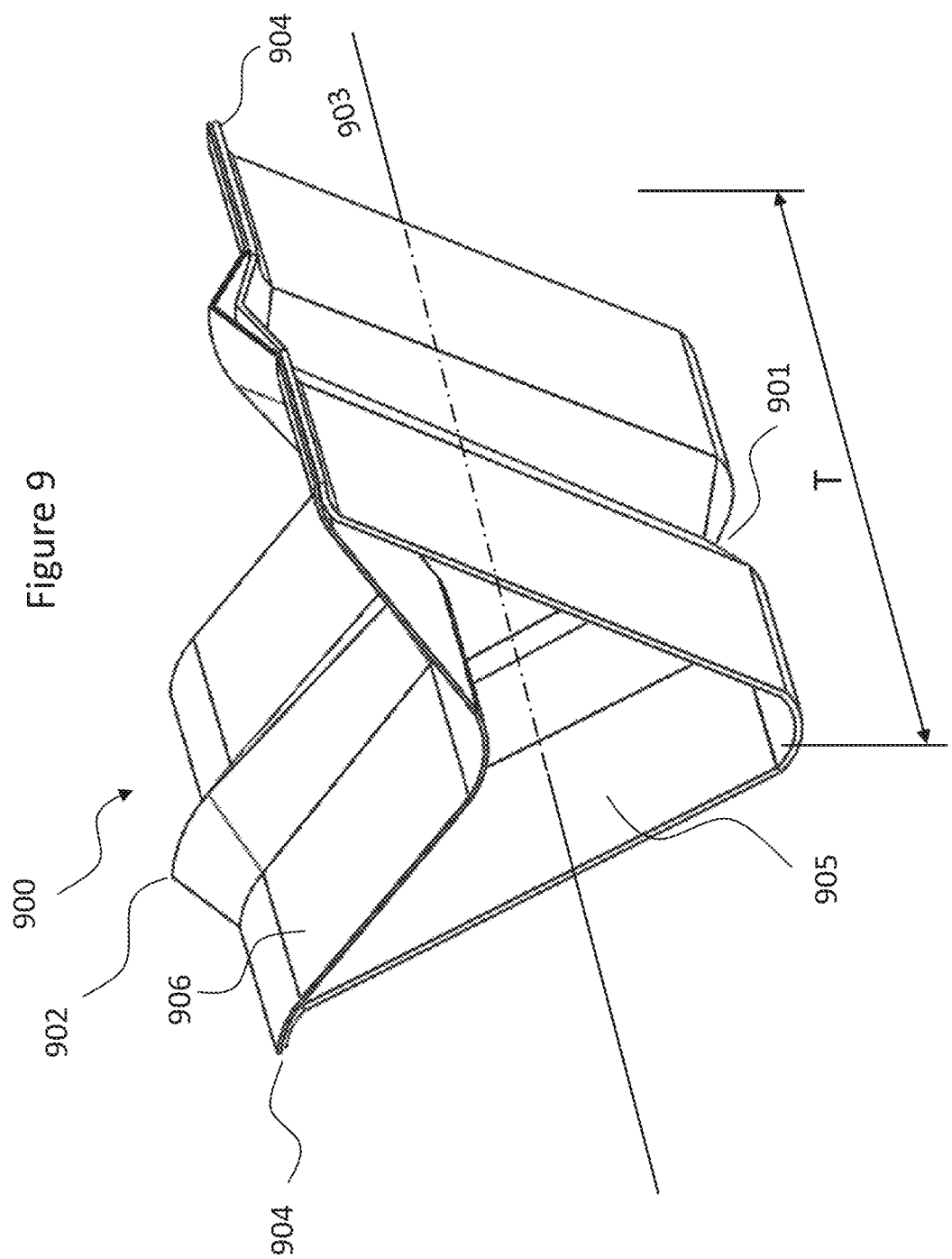
FIG. 9 is a perspective view of a cell from the honeycomb shown in FIG. 8, showing portions of the adjacent cells, in accordance with various embodiments.

FIG. 9 is a perspective view of a cell from the honeycomb shown in FIG. 8, showing portions of the adjacent cells, in accordance with various embodiments. As illustrated in FIG. 9, the illustrated embodiment shows a single honeycomb cell 900 with centrally arranged geometric perturbation 901 and 902 that circumscribe the cell 900 in a direction not parallel to the longitudinal axis 903 of the cell 901. The surrounding honeycomb cell sidewalls 904 are partially shown, and the cell 900 has a height T. In the illustrated embodiment, a first geometric perturbation 901 is applied in a concave manner relative to a first sidewall 905 of the cell 900. A second geometric perturbation 902 is applied in a convex manner relative to a second sidewall 906 of the cell 900. In various embodiments, this alternating arrangement of concave and convex perturbations 901 and 902 may enable a regular cell geometry of the cellular structure. In various embodiments, if the cellular structure is manufactured by fusion of pre-formed sheets, this alternating arrangement of concave and convex perturbations may facilitate the accurate alignment and stacking of preformed sheets to assemble a regular cellular structure.

FIG. 10 depicts a method for manufacturing the impact-absorbing honeycomb of FIG. 8 by additive manufacturing of two types of layers 1001 and 1002 in an alternating manner, in accordance with various embodiments. Layers 1001 and 1002 can be manufactured from flat sheet stock by thermoforming or by profile extrusion. The profile of layer 1001 has a higher amplitude than the profile of layer 1002. For manufacture of a honeycomb structure 1003, layers 1001 and 1002 are stacked in an alternating manner. For assembly, stacked liners will align themselves under modest compression due to their sinusoidal profile. Permanent fusion of the alternating layers 1001 and 1002 to achieve an impact-absorbing structure 1003 may be achieved by adhesive bonding or thermal fusion.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An impact-absorbing structure comprising a plurality of interconnected cells forming a sheet, each cell of the plurality of interconnected cells having at least a first sidewall and a second opposing sidewall, a central void, a longitudinal axis passing through the central void, and a mid-section centrally located along the first and second sidewalls of the each cell, the first and second sidewalls surrounding the central void and being shared between one or more adjacent cells of the plurality of interconnected cells in the sheet, wherein the first and second sidewalls of the each cell comprise a single geometric perturbation located in the mid-section along each of the first and second sidewalls, wherein the single geometric perturbation the each cell is oriented in a direction that is not parallel to the longitudinal axis of the plurality of interconnected cells and projects out of a plane of the first and second sidewalls without an applied load, wherein the single geometric perturbation of the first sidewall of a first cell of the plurality of interconnected cells is convex relative to the first cell and concave relative to a second cell of the plurality of interconnected cells adjacent to the first cell, wherein the single geometric perturbation of the second sidewall of the first cell is concave relative to the first cell and convex relative to a third cell of the plurality of interconnected cells adjacent to the first cell, wherein the single geometric perturbation in the each cell decreases crush stress at an onset of compression in a direction parallel to the longitudinal axis of at least one cell of the plurality of interconnected cells by initiation of compression of the single geometric perturbation, wherein the single geometric perturbation in the each cell reduces a load required to induce transverse shear of the impact-absorbing structure in response to a tangential load, and wherein a portion of each of the first and second sidewalls containing the single geometric perturbation has a lower compressive stiffness than a portion of each of the first and second sidewalls without the single geometric perturbation.

2. The impact-absorbing structure of claim 1, wherein at least one cell of the plurality of interconnected cells exhibits a plurality of compressive stiffness values when a load is applied to the at least one cell in the direction parallel to the longitudinal axis of the at least one cell.

3. The impact-absorbing structure of claim 1, wherein the single geometric perturbation in the each cell is a crease, a bump, or a ridge in the first and second sidewalls.

4. The impact-absorbing structure of claim 1, wherein the impact-absorbing structure is formed from a plurality of joined formed sheets or cells.

5. The impact-absorbing structure of claim 1, wherein the impact-absorbing structure is manufactured by producing layers using an additive manufacturing technique.

6. The impact-absorbing structure of claim 1, wherein the sheet or plurality of interconnected cells is/are produced via extrusion or through a mechanical forming process.

7. The impact-absorbing structure of claim 1, wherein the single geometric perturbation in the each cell is applied to a preexisting sheet or cell.

8. The impact-absorbing structure of claim 1, wherein the first and second sidewalls comprise a polymer, an elastomer, a metal, a cellulose, a resin, a paper, or a combination thereof.

9. The impact-absorbing structure of claim 1, wherein the impact-absorbing structure exhibits synclastic and/or auxetic properties.

10. An impact-absorbing structure comprising a repeating pattern of cells, each cell of the repeating pattern of cells having a central void, a longitudinal axis, at least a first sidewall and a second opposing sidewall, the first and second sidewalls surrounding the central void and being shared between one or more adjacent cells of the repeating pattern of cells, and a mid-section centrally located along the first and second sidewalls of the each cell, wherein the first and second sidewalls of the repeating pattern of cells each comprise a single geometric perturbation located in the mid-section along each of the first and second sidewalls and oriented in a predominantly transverse direction relative to the longitudinal axis and projecting out of a plane of the first and second sidewalls prior to an applied load, wherein the single geometric perturbation of the first sidewall of a first cell of the repeating pattern of cells is convex relative to the first cell and concave relative to a second cell of the repeating pattern of cells adjacent to the first cell, wherein the single geometric perturbation of the second sidewall of the first cell is concave relative to the first cell and convex relative to a third cell of the repeating pattern of cells adjacent to the first cell, wherein the single geometric perturbation in the each cell decreases crush stress at an onset of compression in a direction parallel to the longitudinal axis of at least one cell of the repeating pattern of cells by initiation of compression of the single geometric perturbation, and wherein a portion of each of the first and second sidewalls containing the single geometric perturbation has a lower compressive stiffness than a portion of each of the first and second sidewalls without the single geometric perturbation.

11. A protective headgear comprising the impact-absorbing structure of claim 10 and an outer shell, wherein the impact-absorbing structure absorbs an impact and allows a wearer's head to move transversely with respect to the outer shell of the protective headgear.

12. The impact-absorbing structure of claim 10, wherein the first and second sidewalls of the each cell have a reentrant cell geometry defined by at least one curvature oriented in the direction parallel to the longitudinal axis of the repeating pattern of cells to enable the impact-absorbing structure to conform to a spherical shape and experience synclastic behavior.

13. An impact-absorbing structure, comprising:
a plurality of pre-formed sheets stacked and coupled in an alternating arrangement, wherein the plurality of pre-formed sheets comprises sheets of a first amplitude alternating with sheets of a second lower amplitude,
wherein a series of cells are defined by the plurality of pre-formed sheets stacked and couple in the alternating arrangement and each cell of the series of cells has at least a first sidewall and a second opposing sidewall, an open space there-between, and a longitudinal axis passing through the open space, the first and second sidewalls being shared between one or more adjacent cells of the series of cells, wherein the first and second sidewalls of the each cell comprise a geometric perturbation, wherein the geometric perturbations in the each cell is oriented in a direction that is not parallel to the longitudinal axis of the series of cells and projects out of a plane of the first and second sidewalls without an applied load, wherein the geometric perturbation of the first sidewall of a first cell of the series of cells is convex relative to the first cell and concave relative to a second cell of the series of cells adjacent to the first cell, wherein the geometric perturbation of the second sidewall of the first cell is concave relative to the first cell and convex relative to a third cell of the series of cells adjacent to the first cell, wherein the geometric perturbations in the each cell decreases crush stress at an onset of compression in a direction parallel to the longitudinal axis of at least one cell of the series of cells by initiation of compression of the geometric perturbation, wherein the geometric perturbation in the each cell reduces a load required to induce transverse shear of the impact-absorbing structure in response to a tangential load, and wherein a portion of each of the first and second sidewalls containing the geometric perturbation has a lower compressive stiffness than a portion of each of the first and second sidewalls without the geometric perturbation.

14. The impact-absorbing structure of claim 13, wherein the geometric perturbation in the each cell is formed in the plurality of pre-formed sheets before the plurality of pre-formed sheets are stacked, and extends along a length of the plurality of pre-formed sheets.

* * * * *